TRACKING SYSTEM APPARATUS AND SIGNAL PROCESSING METHODS

Filed July 27, 1967 4 Sheets-Sheet 1

TRACKING SYSTEM APPARATUS AND SIGNAL PROCESSING METHODS

United States Patent Office 3,507,991
Patented Apr. 21, 1970

3,507,991
TRACKING SYSTEM APPARATUS AND SIGNAL PROCESSING METHODS

Lawrence J. Scotchie, Westerville, Ohio, and Wallace W. Windle, Utica, Mich., assignors to North American Rockwell Corporation, a corporation of Delaware
Filed July 27, 1967, Ser. No. 658,308
Int. Cl. H04n 5/38, 7/18
U.S. Cl. 178—6.8 19 Claims

ABSTRACT OF THE DISCLOSURE

A target tracking system having a single television camera sensor is provided with novel logic means and methods in the system tracker unit, such means and methods functioning with the available sensor electron beam deflection circuits to accomplish coordinated scanning of the camera field of view along lines having a direction at right angles to the direction of camera basic line scan for a selected number of scan lines during video signal blanking intervals. Target edge contrasts detected in the coordinate lines of scan, when singularly coincident in each coordinate line of scan with a variably-positioned coordinate direction tracking gate, are further processed to form tracking error correction signals for the coordinate direction.

Summary of the invention

Broadly, a tracking system of the type having a single television camera sensor is provided with apparatus and signal processing methods that function to accomplish target scanning in coordinating directions at right angles to each other. Azimuthal tracking alignment information, for instance, is developed from scan lines along the camera basic scan direction; elevational tracking alignment information, in accordance with the invention, is the developed from actual scanning in the coordinate direction rather than by synthesis from tracking information developed in the camera basic mode of scan. In accomplishing the actual coordinate scanning with the single television camera sensor to obtain an elevational tracking capability that is independent of azimuthal tracking, novel logic means and signal processing methods are provided to accomplish the coordinate scanning during video signal blanking intervals between successive camera field scans. Such means and methods cooperate with the television camera sensor electron beam deflection circuits and serve to establish the interval of and number of individual scan lines in the coordinate scan line sequence, to ideally locate the squence within the preferred video signal blanking intervals and to align the coordinate scan line sequence with the tracking gate of the basic scan direction. The invention may advantageously utilize coordinate scanning during alternate vertical blaking intervals to minimize the effects of vidicon persistence causing degradation of tracking performance in the basic direction. Position spacing between successive individual coordinate scan lines in a coordinate scan sequence interval is also accomplished in connection with the novel camera deflection circuit arrangements and operating methods of the invention.

Description of the drawings

FIGS. 6(*a*) and 6(*b*) are waveform diagrams showing the composite sensor horizontal and vertical deflection waveforms developed by the deflection logic section of FIG. 5;

Detailed description

Figure 1:
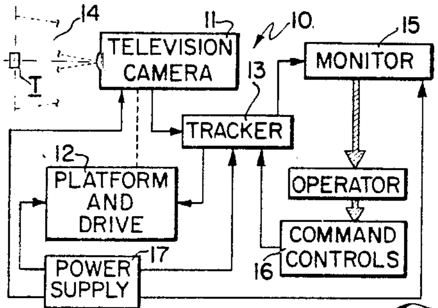
FIG. 1 is a functional block diagram of a tracking system of the type which may advantageously incorporate a tracker unit having the features of this invention.

The type of tracking system to which this invention has application is illustrated generally by the functional block diagram of FIG. 1. Such tracking system is referenced as 10 and is essentially comprised of a single optical sensor in the form of television camera unit 11, a conventional platform and drive unit 12, and a tracker unit 13. The platform portion of unit 12 serves to movably support television camera 11; during operation of system 10 in its automatic tracking mode the drive portion of unit 12 functions to move the platform and supported camera unit 11 in azimuthal and elevational tracking relation to the relatively movable target T positioned within the field of view designated 14. Tracker unit 13 regulates tracking movement of platform and drive unit 12 (and camera unit 11) in a closed loop control relationship. In addition, system 10 typically includes a monitor unit 15 in the form of a conventional monochrome television picture tube that provides a visual display of the general tracking problem viewed by the optical sensor 11 and a visual indication of system tracking alignment. A human operator provides the link between monitor unit 15 and the command controls function designated 16. The operator is normally responsible for accomplishing such command functions as: activating the system, selecting the system mode of operation (scanning or automatic tracking), identifying the target, and obtaining acquisition of the identified target in the system tracking reticle prior to lock-on for automatic system tracking. A power supply 17 of conventional form is included in system 10 to provide electrical energy for system operation.

Figure 2:
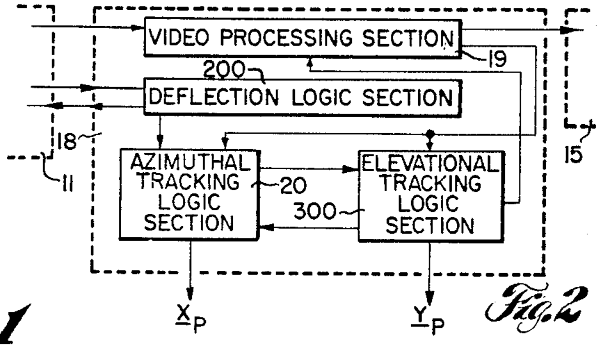
FIG. 2 is a functional block diagram of a tracking system tracker unit having the instant invention incorporated therein.
Figure 5:
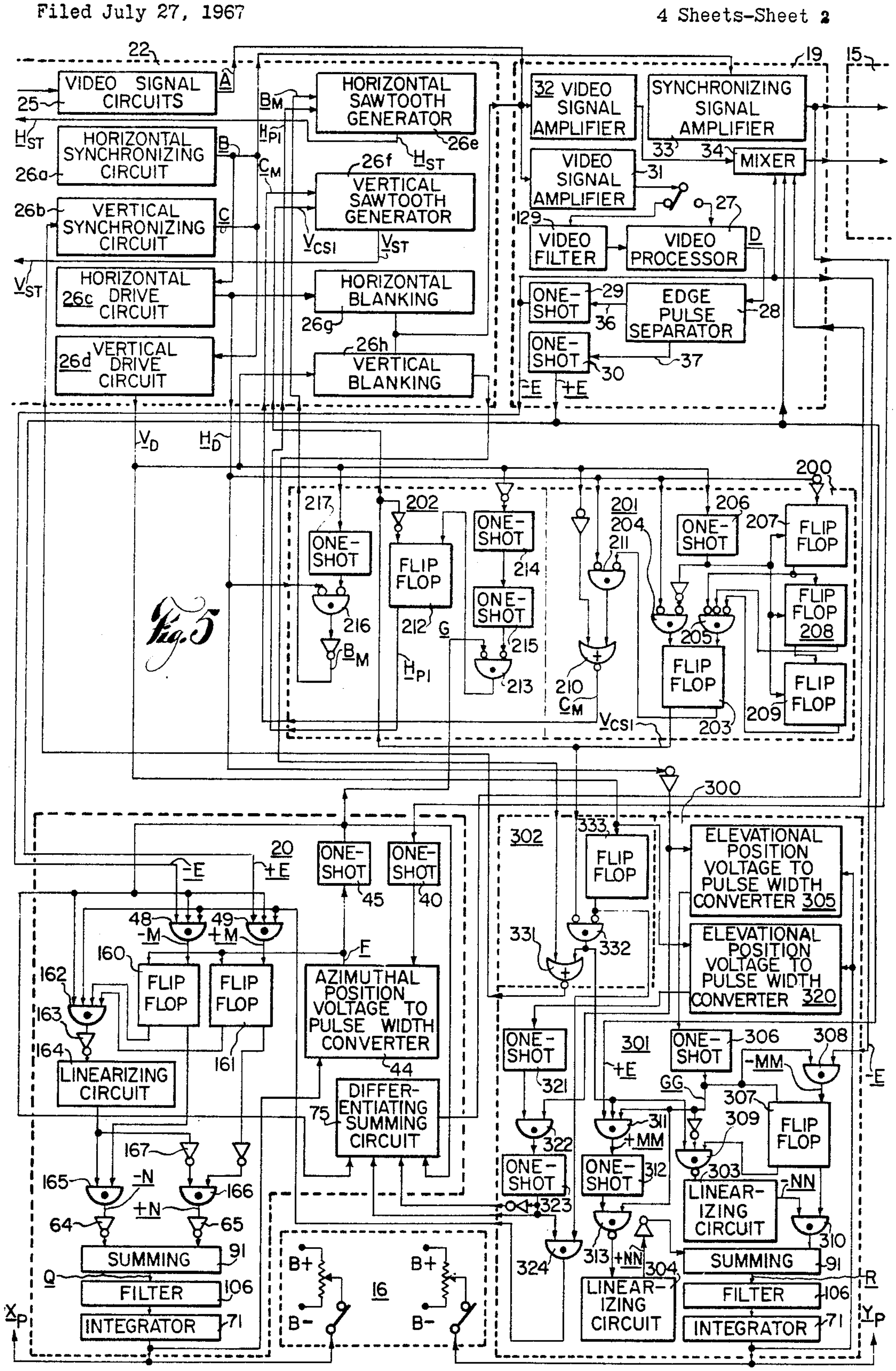
FIG. 5 is a schematic diagram of a preferred embodiment of a tracker unit having our invention incorporated therein.

Tracker unit 13, in an embodiment referenced as 18 and having the instant invention incorporated therein, is detailed further by the functional block diagram of FIG. 2 and by the schematic diagram of FIG. 5. Such tracker unit, insofar as the functions accomplished by included blocks 19 and 20 are concerned, is essentially identical to the tracker unit disclosed in detail by allowed copending applications Ser. Nos. 403,396 through 403,400, and 406,211, assigned to the assignee of the invention. The reference numerals utilized in this application in connection with the elements of blocks 19 and 20 of system 10 identify components that essentially correspond in form and function to cmponents similarly referenced and described in the prior applications.

Figure 4:
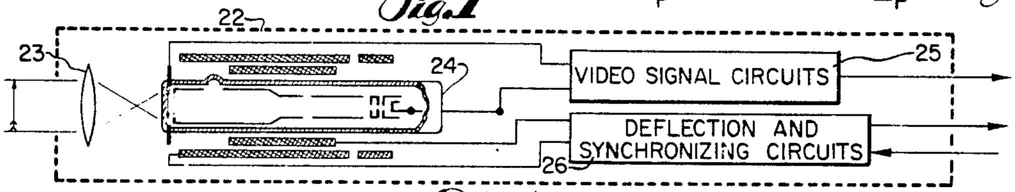
FIG. 4 is a combied sectional view and functional block diagram of a television camera sensor unit utilized for accomplishing the television camera sensor function of FIG. 1.
Figure 3:
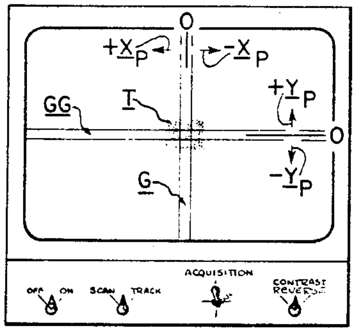
FIG. 3 is an elevational view of one form of monitor unit and command control unit utilized for accomplishing the corresponding functions shown in separate blocks in FIG. 1.

FIG. 4 is included in the drawings to provide a schematic illustration of one type of television camera unit that has been utilized in a tracking system 10 incorporating a tracker unit having the features of the instant invention. Such television camera unit is referenced generally as 22 and is basically comprised of a lens system 23, a cooperating vidicon-type camera tube 24 functioning as the sensor, video signal circuits 25, and deflection and synchronizing circuits 26. The vidicon-type camera tube 24 in an actual embodiment of our invention had a video signal electrode photoconductive layer with a ⅜" x ½" format and utilized conventional electrostatic electron beam deflection. The video signal circuits of unit 22 of the arrangement operated to produce a standard 1-volt television camera output video signal (A). Block 26 in the camera unit produced horizontal synchronization signals to establish a line scan rate of 15,750 cycles per second in the camera basic scan direction. Such deflection and synchronization circuit also produced vertical synchronization pulses at the rate of 60 per second. The camera basic (horizontally) scan direction was utilized for azimuthal tracking; camera vertical deflection corresponded in direction to elevational tracking and the related coordinate scanning.

The actually-used camera unit developed a 60 cycles per second field scan rate with interlacing of successive fields to obtain 525 line raster resolution. Deflection and synchronizating circuits 26 included sub-circuits **26*a* through 26*h* (FIG. 5) to respectively accomplish: (a) scan line horizontal synchronization, (b) scan line vertical (field) synchronization, (c) horizontal deflection drive initiation, (d) vertical deflection drive initiation, (e) horizontal deflection sawtooth drive generation, (f) vertical deflection sawtooth drive generation, (g) horizontal video signal blanking, and (h) vertical video signal blanking. Such sub-circuits essentially corresponded to conventional vadicon camera deflection and synchronization circuits, except that the horizontal and vertical deflection sawtooth drive waveforms and the horizontal and vertical video signal blanking pulses are controlled and modified in a novel manner by tracker unit 18 during the operation of system 10** in an automatic tracking mode using the instant invention.

Tracker unit 13, in the specific embodiment 18 of FIG. 2, includes a video processing section 19 and an azimuthal tracking logic section 20 substantially corresponding to similar sections in the above-referenced, previously-disclosed, tracker unit embodiments. Tracker unit 18 is further provided with the deflection logic section designated 200 and the elevational tracking logic section designated 300. Deflection logic section 200 functions in response to synchronization and deflection signals received from circuits 26 of sensor unit 22 to establish the interval of and number of independent scan lines in the coordinate scan line sequence of this invention, to locate established scan line sequences within selected video signal blanking intervals, and to align each coordinate scan line sequence with the tracking gate of the camera basic scan direction.

Since an understanding of the arrangement and functioning of video processor section 19 and azimuthal tracking logic section 20 is helpful to an understanding of the instant invention, brief summaries are provided with respect to such sections as follows. Video processor section 19 essentially includes a video processor circuit 27, an edge pulse separator circuit 28, and one-shot circuits 29 and 30 to develop target edge marker pulses (E) from contrast changes associated with target edges. Amplifier circuits 31 through 33 and mixer circuit 34 are conventional and are provided in section 19 largely as a matter of convenience; such circuits basically function to provide signals of usable amplitude levels or for use in monitor 15. Video filter circuit 129 may be used selectively to screen out video signal information not of interest during tracking. Video processor circuit 27 receives amplified video signal A and by differentiation detects significant increases and decreases in signal voltage which occur within each camera line of scan, such increases and decreases in voltage in each line of scan across the target being at least in part correlated to target edges viewed by the sensor. The output positive and negative edge pulses D of circuit 27 are conducted to edge pulse separator circuit 28 for classification into separate channels 36 and 37 on the basis of their voltage change characteristics; circuit 28, however, converts all received pulses to one polarity (positive) after categorization into the separate classes. Those edge pulses which indicate one class of detected voltage changes (as for instance changes associated with a target leading edge) are conducted by channel 36 to one-shot circuit 29 where a squaring and stretching function is accomplished. Similarly, those edge pulses which are associated with detected video signal voltage changes of the opposite class (as for instance changes associated with a target trailing edge) are conducted by channel 37 to one-shot circuit 30 where a similar squaring and stretching function is achieved. Such one-shot circuits, as in the case of other one-shot circuits disclosed in the drawings, are more aptly described as monostable multivibrator circuits that are triggered by the leading edge of received positive-going D pulses. It is desirable that the stretched pulse durations obtained by circuits 29 and 30 should be approximately 1⁄10 to ⅕ of the minimum image duration of the selected target as projected on the individual camera scan line. In one embodiment of video processor section 19, edge marker pulses designated —E and +E and produced by circuits 29 and 30 were each 0.3 microsecond in duration. Such —E and +E pulses are the basic output signals of video processor section 19, are associated with leading and trailing edges, respectively, of an aligned target, and are utilized when accomplishing automatic azimuthal and elevational tracking in sections 20 and 300.

With respect to the essential features of azimuthal tracking logic section 20 of this and the prior applications, one-shot circuit 40 is provided to synchronize the operation of logic section 20 with camera unit 11 and video processor section 19 operation. An azimuthal tracking gate pulse G having a controlled variable time position in each scan line in the camera basic direction of scan is developed essentially by means of controllable monostable multivibrator circuit 44 and cooperating one-shot circuit 45. The output signal F of circuit 44 is a negative-going pulse whose time duration is correlated to the magnitude of the tracking error correction signal $X_p$ developed by section 20 as a whole. Output pulse F has a positive-going trailing edge that triggers one-shot circuit 45. One-shot circuit 45 develops a positive output tracking gate pulse G having a short time duration and functioning as the tracking gate for the azimuthal direction. The detection of tracking alignment error in the azimuthal direction is accomplished essentially by paired but independent AND gate circuits 48 and 49. Each such AND gate preferably utilizes three input terminals, one input terminal of each gate receiving the azimuthal tracking gate pulse G originated by one-shot circuit 45. Another input terminal of each such END gate receives a signal that indicates concurrent elevational tracking. AND gate circuit 48, in the arrangement of FIG. 5 further receives all —E or leading target edge marker pulses developed by one-shot circuit 29 of video processor section 19. Similarly, AND gate 49 further receives all of the +E target edge marker pulse signals developed by one-shot circuit 30 of the video processor section.

AND gate circuits 48 and 49 function to detect tracking errors by passing −E and +E edge marker pulse signals to clear flip-flop circuits 160 and 161, respectively, when such target edge marker pulse signals are coincident with the basic tracking gate G during concurrent elevational tracking. When the sensor 11 and platform 12 of tracking system 10 are aligned with the selected target in tracking relation (and assuming the detected target edges are spaced-apart a greater width than the tracking gate pulse), no −E or +E marker pulses are gated through AND gates 48 and 49. When either a −E or +E marker pulse is singularly coincident with the azimuthal tracking gate during concurrent elevational tracking, thus indicating a degree of tracking misalignment, the gated marker pulses in successive scan lines function as effective tracking error detection pulse signals. Such tracking error detection signals appear in FIG. 5 with −M and +M designations. Such −M and +M tracking error detection signals in particular serve to define the variable duration of azimuthal tracking error correction pulse signals (N), which pulse signals are the output of AND gates 165 and 166. As described in connection with the previously referenced co-pending application Ser. No. 403,398 (FIG. 26), improved (increased) tracking loop gain may be achieved in azimuthal tracking logic section 20 by utilizing or developing tracking error pulse signals (+N, −N) that each have a time duration that is proportional to the degree that the source coincident target edge marker pulse (−E, +E) intrudes into the basic azimuthal tracking gate pulse (G) from its adjacent edge. Flip-flop circuits 160 and 161 in the logic section 20 arrangement are set (and reset) by the negative-going pulse signal output F of azimuthal position voltage to pulse width converter 44. Detected singularly coincident edge market pulses (E) gated as tracking error detection pulse signals (M) serve to clear flip-flop circuits 160 and 161, respectively, and thereby define the degree of target edge intrusion. Linearizing circuit 164 is essentially a pulse width to pulse width converter with the maximum pulse output preferably being approximately 1-scan line duration (e.g., 60 microseconds) for a 100% target edge marker pulse intrusion into tracking gate pulse G. As an example of such proportioning, a singularly coincident marker pulse (E) positioned midway in a one microsecond tracking gate pulse G would result in a 30 microsecond circuit 164 output for the 60 microsecond maximum period representing maximum intrusion. The remaining particularly significant portions of logic section 20 include a summing circuit 91, an integrater circuit 71, and an intermediate filter circuit 106. Such additional circuits function to develop a tracking error correction signal ($X_p$) in DC voltage analogue form for controlling the movement of tracking system sensor 11 and platform 12 in tracking relation to the relatively moving or movable target T and equally important for variably positioning tracking pulse G in each azimuthal tracking scan line. The output of summing circuit 91 is designated Q and is averaged and smoothed by filter 106 for integration in integrator circuit 71. Tracking error correction signal $X_p$, as the control input to controllable monostable multivibrator circuit 44, functions to drive the tracking gate pulse G away from the gated singularly coincident target edge marker pulse E sourcing the signal and toward the target interior (or opposite edge marker pulse or different class). The $X_p$ signal is also a measure of the correction required to correspondingly realign the platform 12 (and sensor 11) in tracking relation to the selected target.

Figures 6A, 6B, 7:
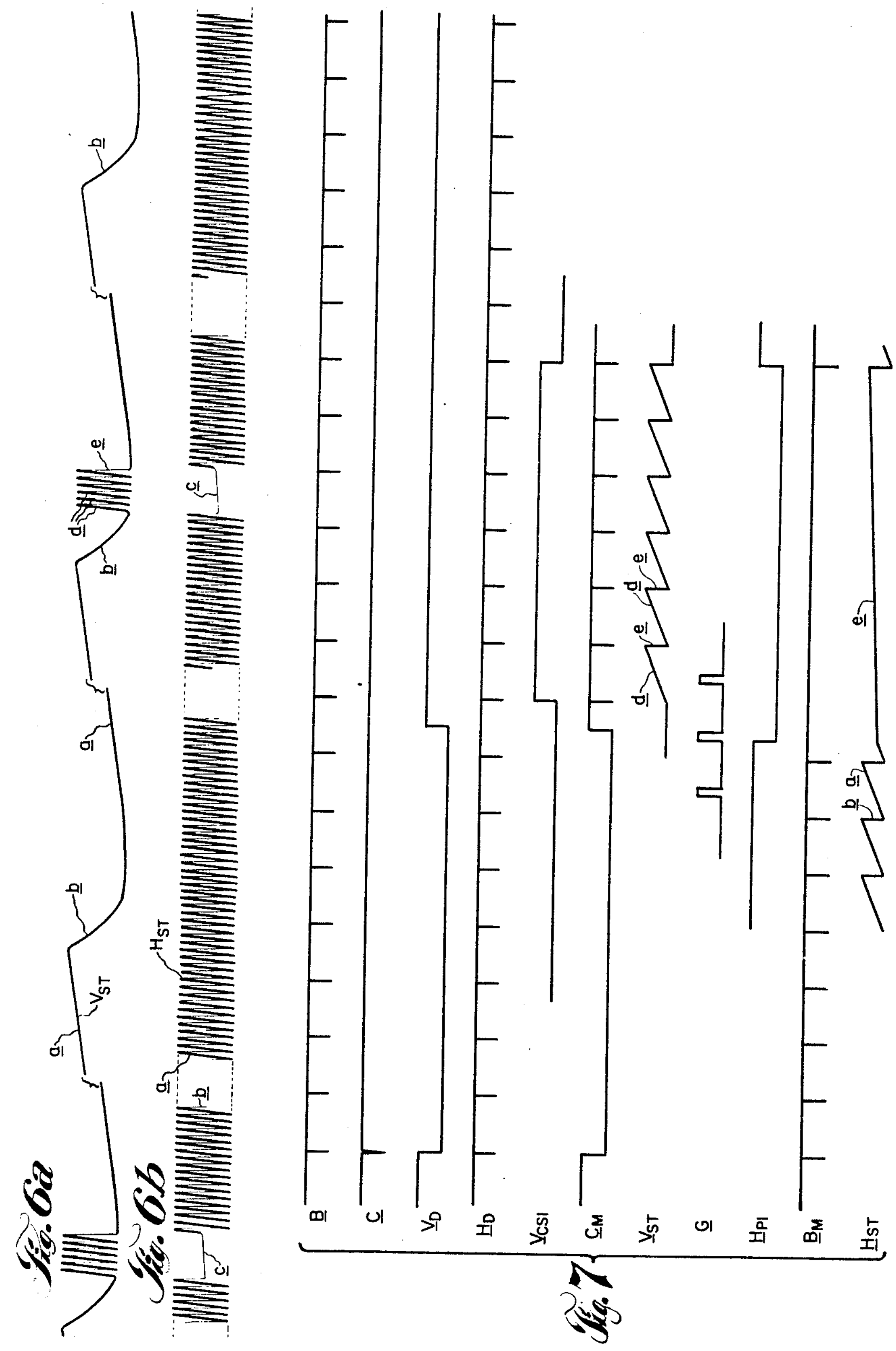
FIG. 7 is a timing diagram for the deflection logic section of FIG. 5.

An understanding of the arrangement and operation of deflection logic section 200 of the invention may be obtained in part from an understanding of the sensor electron beam deflection modification that is accomplished by such section in combination with sensor deflection circuits 26*e* and 26*f*. FIGS. 6(*a*) and 6(*b*) disclose the novel composite deflection waveforms $V_{ST}$ and $H_{ST}$ that are produced as the output of such deflection circuits. The output waveform of circuit 26*f* accomplishes normal vertical and coordinate scanning and is identified as $V_{ST}$; the output waveform from circuit 26*e* for accomplishing horizontal electron beam deflection, which deflection is in the basic direction of sensor scan, is designated as $H_{ST}$. Electron beam deflection, in one embodiment of our invention, is accomplished by electrostatic charging during the intervals extending from lower amplitude values to upper amplitude values. In the cast of vertical deflection waveform $V_{ST}$, scanning from the lower amplitude values to the upper amplitude values (waveform portions *a*) correspond to sweeping from the camera field of view top margin to the camera field of view bottom margin. In the case of the $H_{ST}$ signal, electron beam deflection waveform portions *a* from the lower (zero) amplitude values to upper amplitude values involved scanning along the basic direction from the camera field of view left margin to the camera field of view right margin. Beam return intervals *b* extending from upper amplitude values to lower amplitude values are obtained by switched discharging of the electrostatic deflection circuits. In one actual embodiment of our invention, a basic repetition frequency of 15,750 c.p.s. was utilized for signal $H_{ST}$ throughout except for the near-horizontal (slightly upwardly sloped) wavefor portion *c* associated with the coordinate scanning of this invention. With respect to waveform $V_{ST}$, a sweep repetition frequency of 60 c.p.s. was utilized for signal portions *a* and *b* except during the period of coordinate scanning. Coordinate scanning was accomplished by signal portions *d* and *e* during the interval of waveform $H_{ST}$ portion *c* and preferably at a frequency corresponding to the basic scanning frequency of signal $H_{ST}$. In the FIG. 6*a* $V_{ST}$ waveform, six separate scan lines *d* are utilized for the coordinate scanning sequence; the number of scan lines actually selected is based on the different parameters affecting tracking system performance. The sequence of coordinate scan lines included in composite signal $V_{ST}$ is positioned within the video signal blanking interval coordinated with signal return portion *b*; is it preferred, also, that such sequence be essentially centered within the blanking interval between successive fields.

Deflection logic section 200 is essentially comprised of cooperating portions 201 and 202. Portion 201 establishes the system coordinate scanning interval ($V_{SCI}$) and also a vertical deflection synchronization modifier signal $C_M$ for sensor 22 using components 203 through 211; portion 202 functions to position (signal $H_{PI}$) the coordinate scan lines in coincident relation to the azimuthal tracking gate of the lines of basic direction scan and to establish a horizontal deflection synchronization modifier signal $B_M$ for sensor 22. Portion 202 is typically comprised of illustrated components 212 through 218. The waveform establishing the coordinate scanning interval is $V_{CSI}$ (FIG. 7) and is a positive-going ("1") pulse output from conventional flip-flop circuit 203. The input pulse (active) signal that sets flip-flop circuit 203 is the output signal of AND gate circuit 204; the input pulse signal that clears flip-flop circuit 203 and thereby defines the end of each coordinate scanning interval is the output pulse obtained from AND gate circuit 205. It is preferred that $V_{CSI}$ pulse be positioned approximately in the center of the associated video signal blanking interval and conventional one-shot circuit 206 is provided in portion 201 essentially for accomplishing that objective. One-shot circuit 206 is triggered by the trailing edge of the negative output pulse $V_D$ of vertical drive circuit 26*d* and serves to narrow the start of the coordinate scanning interval by AND gate 204 and to narrow the start of a counting operation that is accomplished by the conventional counting circuit made up of AND gate 205 and flip-flop circuits 207 through 209 arranged in ripple carry binary counter form. In one actual embodiment of our invention, one-shot circuit 206 formed a 50 microsecond positive pulse immediately following a 7-½-line (476 microsecond) negative vertical drive pulse $V_D$; 6-line (381 microsecond) coordinate scanning intervals were thereby centered within 22-½-line (1430 microsecond) video signal vertical blanking intervals. AND gate 204 sets flip-flop 203 by gating the first negative horizontal drive pulse $H_D$ occurring after the pulse output of one-shot circuit 206 to define the start of the coordinate scanning interval. The duration of the coordinate scanning interval is essentially controlled by the pulse counter comprised of flip-flop circuits 207 through 209, such counter (in the case of a 6-line coordinate scan line sequence) in essence serving to isolate a sequence of horizontal drive pulses $H_D$ that are one more in number (7) than the number of lines selected and desired for the coordinate scanning interval. The individual pre-set pulse input to each flip-flop circuit in the counter is the output pulse of one shot circuit 206. The counted pulses are the successive horizontal drive pulses $H_D$ introduced, after inversion to positive-going form, at the toggle input terminal of flip-flop circuit 207. The "zero" and "one" outputs of the counter flip-flop circuits may be AND-ed and AND gate 205 to provide the terminal pulse $H_D$ that clears flip-flop circuit 203. The $V_{CSI}$ pulse waveform of circuit 203 is one input to vertical sawtooth generator circuit **26*f* to develop the required deflection waveform. Portion 201 also employs OR gate 210 and AND gate 211 to obtain synchronization modification pulses $C_M$ at the coordinate scan sweep frequency for circuit 26*f*. As shown by FIG. 5, such pulses are developed by OR gate 210 gating each $V_D$ pulse and also each pulse $H_D$ gated through AND gate 211 during the coordinate scanning interval. The $V_{CSI}$ and $C_M$ pulses control the vertical sawtooth generator circuit 26*f*** output to provide the deflection waveform $V_{ST}$ of FIG. 6. A circuit arrangement for obtaining the required vertical deflection waveform modification in a conventional sensor vertical sawtooth deflection waveform generator in response to the $V_{CSI}$ and $C_M$ pulse inputs is illustrated and hereinafter described in connection with FIG. 8.

With respect to portion 202 of deflection logic section 200, flip-flop circuit 212 functions to provide a pulse signal $H_{PI}$ (FIG. 7) that in effect horizontally positions the coordinate scan line sequence in registration with the interval of the azimuthal tracking gate. Such assures that target edge information derived from the tracker system video signal during the coordinate scanning interval is restricted to the target actually being tracked in the direction of basic scanning. Flip-flop circuit 212 is set by the output of AND gate 213 (to define the start of $H_{PI}$) and is cleared by the trailing edge of the $V_{CSI}$ signal from flip-flop circuit 203 (to define the end of $H_{PI}$). It is necessary to identify the sensor line of basic scan that precedes the start of coordinate scan sequence interval $V_{CSI}$, and logic portion 202 is further provided with sequential one-shot circuits 214 and 215 for that purpose. With respect to the previously referenced actual embodiment of our invention, one-shot circuit 214 was triggered at the start of a video signal blanking interval by the vertical drive pulse $V_D$ in inverted form and had a duration of 450 microseconds. The trailing edge of the output of one-shot circuit 214 triggered one-shot circuit 215 to in effect produce a gating pulse of approximately 1-line duration (70 microseconds) delayed by 450 microseconds and within which the azimuthal tracking gate pulse of the azimuthal scan line preceding the start of $V_{CSI}$ will appear. $H_{PI}$ starts within the interval of the circuit 215 output. The output of circuit 214 is AND-ed at AND gate circuit 213 with the variably-positioned azimuthal tracking gate pulse G obtained from one-shot circuit 45 in azimuthal tracking logic section 20 of the system. The horizontal position interval output signal $H_{PI}$ of flip-flop circuit 212 accordingly is a pulse having an initial edge position in time corresponding to the leading edge position of the azimuthal tracking gate; such pulse has a duration corresponding to the duration of the coordinate scan interval $V_{CSI}$ and serves to locate the horizontal position of the vertical coordinate scan line sequence in the sensor field of view. Components 216 and 217, and the subsequent inverter, function to provide a horizontal deflection synchronization modifier signal $B_M$ for horizontal sawtooth generator circuit **26*e*. Such synchronization modifier signal, when utilized in circuit 26*e* with the position interval pulse $H_{PI}$ as hereinafter described, functions to prevent repeated horizontal sweeping of the sensor electron beam at the frequency of $H_D$ during the interval of the coordinate scanning sequence and also to enable uniform spacing of the coordinate scan lines over the range of the coordinate scan sequence horizontal position by triggering a controlled slow sweep (FIG. 9) using a supplemental constant current source. One-shot circuit 217 is triggered by the trailing edge of pulse $V_D$ and produces a required blocking interval that ends just before the end of $H_{PI}$ (e.g., 390 microseconds); its output is AND-ed at AND gate 216 with the basic horizontal drive pulse $H_D$. The gated $H_D$ pulse output of AND gate circuit 216, designated $B_M$, is inverted and controls the additional functions accomplished in horizontal sawtooth generator 26*e***. A circuit arrangement for obtaining the required horizontal deflection waveform modification in a conventional sensor horizontal sawtooth deflection waveform generator in response to the $H_{PI}$ and $B_M$ pulse inputs is illustrated and hereinafter described in connection with FIG. 9.

FIG. 7 is provided in the drawings to illustrate key aspects of the timing that exists with respect to the various signals generated, processed, and utilized in circuits **26*a* through 26*h* in deflection logic section 200. Signal waveforms B and C are the conventional horizontal synchronization and vertical synchronization circuit pulse outputs of circuits 26*a* and 26*b*. The signals designated $V_D$ and $H_D$ are the conventional vertical and horizontal drive pulse waveforms controlled in time by, and synchronized to, the outputs B and C of circuits 26*a* and 26*b*. In the referenced actual embodiment of our invention, waveform $V_D$ is a negative-going drive pulse having a duration of 7-½-lines of basic field scan as shown. The interval of coordinate scanning is defined by the leading edge of the positive-going pulse in signal $V_{CSI}$. Signal G is the azimuthal (horizontal) tracking gate pulse obtained from one-shot circuit 45 in previously-described azimuthal tracking logic section 20**. The signals designated $V_{ST}$ and $H_{ST}$ correspond to the signals of FIG. 6 but at an extended time scale.

Figure 8:
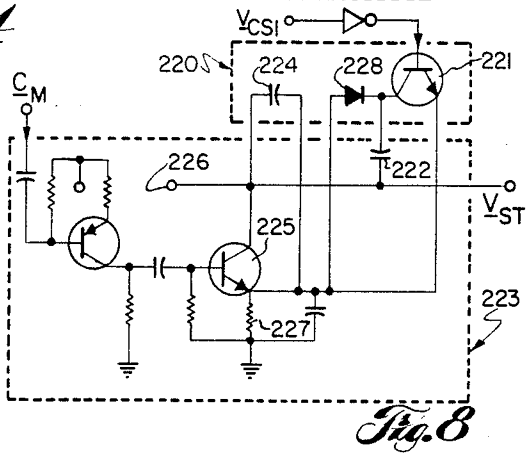
FIG. 8 details sensor vertical synchronizing circuit features preferred for use with the deflection logic section of the tracker unit of FIG. 5.
Figure 9:
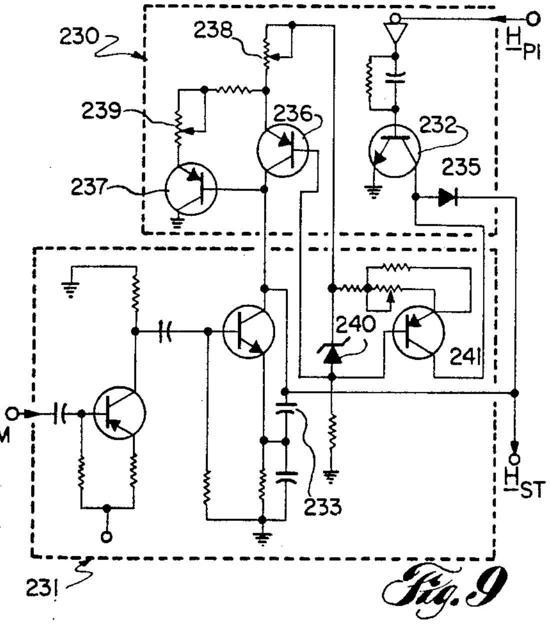
FIG. 9 details sensor horizontal synchronizing circuit features preferred for use with the deflection logic section of FIG. 5.

Details of satisfactory circuit arrangements for utilizing signals $C_M$ and $V_{CSI}$ in cooperation with a conventional vertical sawtooth generator circuit and for utilizing signals $B_M$ and $H_{PI}$ in cooperation with a conventional horizontal sawtooth generator circuit are provided in FIGS. 8 and 9, respectively. As shown in FIG. 8, the desired sawtooth waveform for vertical deflection may be obtained by the circuit modification 220 which includes both transistor 221 connected in series to charging capacitor 222 of the conventional sawtooth generator electronics 223 and an added capacitor 224 connected in parallel. The coordinate scanning interval signal defined by the pulse of waveform $V_{CSI}$ is the control input to transistor 221. When generating the normal vertical sawtooth waveform, transistor 225 is turned off, transistor 221 is turned on, and the constant current charging supply 226 charges parallel capacitors 222 and 224. During normal vidicon signal blanking, transistor 225 is turned on to discharge capacitors 222 and 224 through resistor 227. Diode 228 is added to modification 220 to provide a discharge current path to more completely discharge capacitor 222. During the positive-going pulse of $V_{CSI}$, transistor 221 is turned off to open the charging path for capacitor 222. During such "unblanking," constant current charging source 226 supplies a constant charging current to capacitor 224 alone to produce a charge rate that preferably is the same as the charge rate used in horizontal sawtooth generator circuit **26*e*. The coordinate scan drive pulses of waveform $C_M$, in the interval of $V_{CSI}$, discharge capacitor 224 through transistor 225 and resistor 227** thus producing the selected number of sawtooth waveforms for coordinate scanning.

In FIG. 9, the horizontal sawtooth generator modification 230 combined with conventional horizontal sawtooth generator electronics 231 includes an added transistor 232 that grounds a constant charging current when turned on by and during the pulse interval of signal $H_{PI}$. The pulses of signal $B_M$ are drive inputs to conventional electronics 231 and basically control the normal deflection charging capacitor 233 therein. The normal constant charging current is provided by transistor 241 and Zener diode 240. An added diode 235 is back-biased when transistor 232 turns on thus simultaneously isolating the voltage charge on capacitor 233 from ground. Because of the load characteristics of succeeding stages in the sawtooth generator circuit, it is necessary to include the additional constant current source 236 to charge capacitor 233 at a desired rate (e.g., 1-volt per 6-scan lines) during the period of $H_{PI}$. Since it is important to establish and maintain constant spacing of the individual coordinate scan lines in the interval of $V_{CSI}$, it is necessary to obtain a linear, constant rate slow-sweep charging voltage from capacitor 233. This is accomplished in modification 230 by the addition of current-regulating feedback transistor stage 237. As the initial charge voltage on capacitor 233 increases, transistor stage 237 conducts less, thus allowing transistor 236 to conduct more charging current to capacitor 233 thereby increasing the deflection waveform slope during the slow-sweep (coordinate scanning interval) and properly spacing the coordinate lines of scan in a horizontal sense. Variable resistors 238 and 239 are provided to regulate the desired level and rate of voltage increase.

Elevational tracking logic section 300 generates tracking error correction signals $Y_P$ for system 10 in an edge-repelling manner that essentially corresponds to the operation of previously-referenced and described azimuthal tracking logic section 20. The logic elements in the portion referenced generally as 301 are provided for that purpose. The circuits comprising portion 302, however, are provided for the purpose of developing coordinate scanning in intervals between alternate fields of scan only and as one means to avoid system azimuthal tracking performance deterioration as a consequence of vidicon tube persistence when that objective is desirable. Such alternate frame coordinate scanning, however, is normally associated with a proportional loss of available tracking rate capability. In the portion 302 arrangement, which portion is combined into section 300 as a matter of convenience only, flip-flop circuit 333 functions to divide the field frequency of the vertical drive circuit signal $V_D$ by two. The time coincidence of the squared output pulses of circuit 333 with the coordinate scanning interval signal $V_{CSI}$ from section 200 at AND gate 332 in essence selects the alternate fields for coordinate line scanning. OR gate circuit 331 serves to provide the AND gate 332 selected alternate pulses and the basic vidicon vertical blanking circuit 26*h* outputs as the modified blanking signals to vertical synchronizing circuit 26*b*.

Elevational tracking error correction pulse signals +NN and —NN are developed in logic section 300 essentially in the same manner that azimuthal tracking error correction pulse signals +N and —N are developed in the generally similar logic section 20 described above and in previously-referenced co-pending applications Ser. Nos. 403,396 through 403,400, and 406,211. In the logic section 300 arrangement of FIG. 5, —E edge marker pulses are associated with target leading edges and +E edge marker pulses are associated with target trailing edges. The summing, filter, and integrator circuits 91, 106, and 71, respectively, of logic section 300 correspond to the like circuits of logic section 20. Two linearizing circuits 303 and 304 are utilized in developing proportional tracking error correction pulse signals +NN and —NN instead of the single linearizing circuit 164 of section 20. Elevational position voltage to pulse width converter 305 functions in the manner of circuit 44 of logic section 20 and employs the tracking error correction signal $Y_P$ from integrator circuit 71 to control the elevational position of the elevational tracking gate pulse GG generated by one-shot circuit 306. Such elevational tracking gate pulse may have the same active time durational as gate pulse G of section 20 (one microsecond) to achieve equal tracking loop gain characteristics as between sections 20 and 300; pulse output GG functions to set flip-flop circuit 307. The tracking error detection signal —MM resulting from the coincidence gating of target leading edge marker pulses and the tracking gate pulse at AND gate 308 serves as the active signal that clears flip-flop circuit 307. Thus, the active ("1") signal output from flip-flop circuit 307 to AND gate 309, when coincidence gated with the elevational tracking gate pulse GG and the alternate coordinate scanning interval pulses $V_{CSI}$, initiates and defines the duration of each tracking error correction pulse signal output of linearizing circuit 303. Since the output of circuit 303 is AND gated at AND gate 310 with the "0" output of flip-flop circuit 307, the resulting —NN tracking error correction pulse signal is always diminished at circuit 310 by the time intrusion of marker pulse —E into tracking gate pulse GG. This loss of pulse width at AND gate 310 is always a given percentage loss and can be compensated by adjusting the gain of summing circuit 91. For the tracking error problem illustrated schematically by FIG. 11 wherein the target is assumed to be moving downward relative to the sensor viewing axis at one-half the system maximum tracking rate, the tracking error correction pulse signal output from AND gate 310 to summing circuit 91 in each alternate video signal vertical blanking interval is a sequence of pulses that are each proportioned in duration to the intrusion of the target leading edge into the tracking gate. In the case of a one microsecond tracking gate pulse GG and a linearizing circuit 303 maximum output of 60 microseconds for 100% intrusion, the individual tracking error correction pulses in the FIG. 11 problem tracking error correction sequence are each of 29.5 microseconds duration.

Target trailing edge (+E) marker pulses are coincidence gated with the elevational tracking gate pulse GG and the alternate coordinate scanning interval pulses $V_{CSI}$ at AND gate 311 of logic section 300 for the purpose of developing +MM tracking error detection pulses. Such pulses function to activate one-short circuit 312 having an active signal output duration at least as great as the duration of tracking gate pulse GG. In the actual embodiment of our invention previously referred to, a 5 microsecond output was developed at circuit 312 in connection with a one microsecond gate pulse GG from circuit 306. The output of one-shot circuit 312 is coincidence gated at AND gate 313 with the tracking gate pulse GG to initiate and define the duration of each tracking error correction pulse signal output of linearizing circuit 304. For the tracking error problem illustrated schematically by FIG. 12 wherein the target is assumed to be moving upward relative to the sensor viewing axis at one-fourth the system maximum tracking rate, the tracking error correction pulse signal output from linearizing circuit 304 to summing circuit 91 in each alternate video signal vertical blanking interval is a sequence of pulses that are each proportioned in duration to the intrusion of the target trailing edge into the tracking gate. In the case of a one microsecond tracking gate pulse GG and a linearizing circuit 304 maximum output of 60 microseconds for 100% intrusion, the individual tracking error correction pulses in the FIG. 12 problem tracking error correction sequence are each 15.0 microseconds duration.

Figure 11:
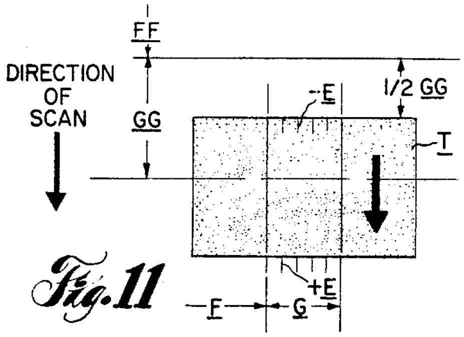
FIG. 11 illustrates one form of assumed elevational tracking error processed into a tracking alignment correction signal by the tracker unit of this invention.
Figure 12:
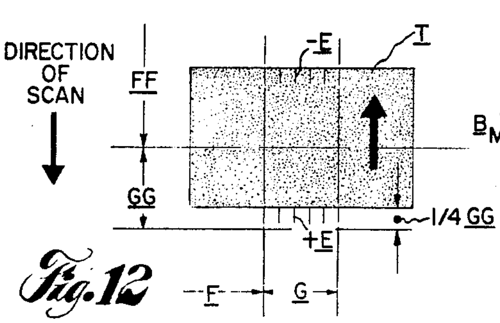
FIG. 12 illustrates another form of assumed elevational tracking error processed into a tracking alignment correction signal by the tracker unit of this invention.
Figure 10:
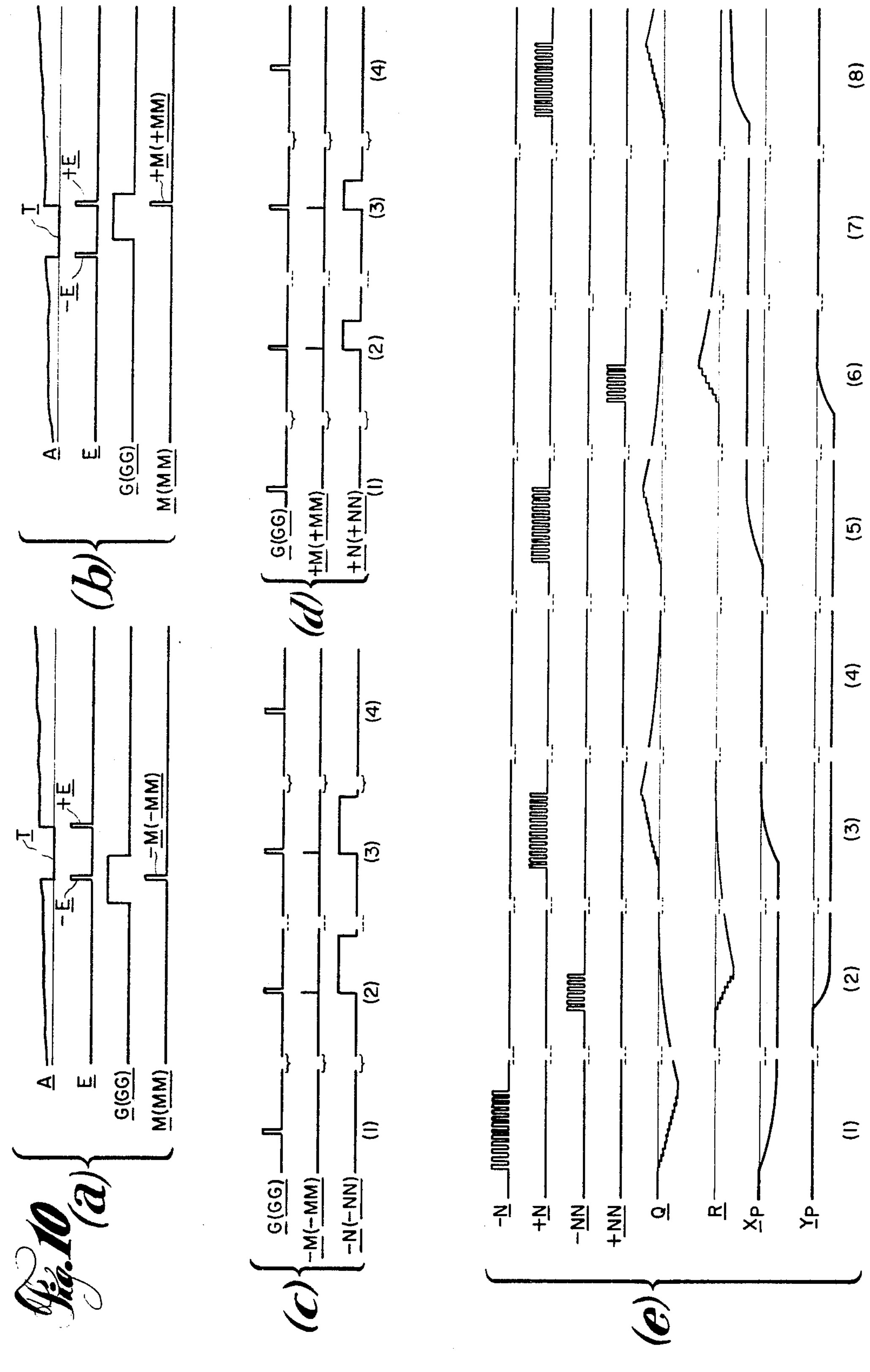
FIGS. 10(*a*) through 10(*e*) are timing diagrams for the azimuthal and elevational tracking logic sections of FIG. 5.

FIGS. 10(*a*) through 10(*e*) are provided to illustrate the actual occurrence of the more significant signals processed in logic sections 20 and 300 in connection with automatic operation of system 10 during the tracking situations illustrated by FIGS. 11 and 12. FIG. 10(*a*) specifically relates to the detection of tracking error when the target T of FIG. 11 is moving either downwardly in elevation or rightwardly in azimuth relative to the previously-positioned related G or GG tracking gate pulse at a rate corresponding to one-half the system maximum tracking rate. As shown by FIG. 10(*a*), the −E target edge marker pulses associated with a detected target leading edge within the tracking gate pulse G or GG produces a −M or −MM tracking error detection pulse at a mid-position in the tracking gate. FIG. 10(*b*), on the other hand, illustrates the tracking situation wherein the target T is moved relatively upwardly or leftwardly with respect to the previously-positioned tracking gate pulse at a rate corresponding to approximately one-fourth the system maximum tracking rate. As shown by FIG. 10(*b*), the target trailing edge marker pulse +E intrudes into the tracking gate pulse G or GG one-fourth of the maximum possible intrusion and produces a +M or +MM tracking error detection pulse in a correlated time position. As shown by FIGS. 10(*c*) and 10(*d*), whenever an M tracking error detection pulse is produced within tracking logic section 20 or tracking logic section 300, a correlated N tracking error correction pulse signal is developed by the appropriate logic section linearizing circuit. In the case of FIG. 10(*c*) the −N (−NN) pulses formed as a result of the −M (−MM) pulses each have a duration of approximately one-half scan line since they are assumed to be based on the relationship of FIG. 10(*a*), such durations are each proportioned to the degree of intrusion of the source +E target edge marker pulse into the related G or GG tracking gate pulse. The FIG. 10(*d*) illustration details a +N (+NN) tracking error correction pulse signal of approximately one-fourth scan line duration. Such duration is proportional to the FIG. 10(*b*) intrusion of the target +E trailing edge marker pulse into the related G or GG tracking gate pulse.

FIG. 10(*e*) illustrates the tracking error correction signal outputs Q and R of summing circuits 91 of logic sections 20 and 300, respectively, and also the resulting $X_P$ and $Y_P$ analog form tracking error correction signals developed by cooperating integrator circuits 71. The FIG. 10(*e*) signal forms are associated with scan line portions (1) throufh (8) that are each less than one full scan line for the purposes of clarity of illustration. In an actual embodiment of a tracker unit incorporating our invention, azimuthal tracking involved tracking gates associated with 12 consecutive basic scan lines and coordinate scanning involved a sequence of 6 coordinate scan lines between field of view scans. Accordingly, the −N and +N sequences in FIG. 10(*e*) each illustrate a total of 12 pulses; the −NN and +NN sequences for coordinate scanning are limited to 6 consecutive pulses. No particular relationship exists as between the successive field portions identified as (1) through (8). As indicated in FIG. 10(*e*), a sequence of −N or +N pulses results in a corresponding opposite polarity voltage signal Q. Similarly, sequences of −NN or +NN pulses result in proportional opposite polarity voltage changes to signal R of the elevational tracking logic section 300. During intervals when the −N or +N pulses (or −N or −NN pulses) are not present, the voltage of signal Q (or R) discharges to a zero value at a comparatively rapid rate. The resulting analog DC voltage signals $X_P$ and $Y_P$ produced by integrator circuits 71 function to re-position (repel) the tracking gates G and GG away from the singularly coincident detected target edge and toward the target interior. Such $X_P$ and $Y_P$ signals also serve as the control signals to platform and drive unit 12 to maintain the viewing axis of sensor 11 in aligned tracking relation to the target of interest.

We claim:

1. A tracking system which generates azimuthal and elevational electrical tracking error signals correlated to detected azimuthal and elevational displacements of target contrast features tracked transversely related to the tracking system sensor viewing axis, and comprising:

(a) a television camera sensor means having an electron beam that transversely scans a field of view and contained target image by deflection and that provides an output video signal which varies in voltage amplitude as a result of scanned target contrast features, (b) video signal processor means receiving said output video signal and generating output target contrast feature marker signals correlated in time to scanned target contrast feature voltage amplitude variations in said output video signal, (c) tracking logic circuit means receiving said output marker signals and generating azimuthal tracking error signals and elevational tracking error signals correlated to detected azimuthal and elevational displacements of tracked target contrast features relative to the tracking system viewing axis, and (d) deflection logic circuit means controlling deflection of said sensor means electron beam to accomplish coordinated scanning of said field of view and contained target image repeatedly with a basic sequence of deflected electron beam scan lines oriented substantially parallel to a basic scan direction and having a blanked interval in said output video signal after each basic sequence scan line and a different blanked interval in said output video signal after each basic sequence, and with a coordinate sequence of deflected electron beam scan lines oriented substantially at right angles to said basic scan direction, said deflection logic circuit means positioning said coordinate sequence scan lines in a coordinate sequence time interval within said output video signal basic sequence-repeated blanked interval and unblanking said output video signal during electron beam coordinate scanning in said coordinate sequence time interval.

2. The invention defined by claim 1, wherein said coordinate sequence time interval is positioned by said deflection logic circuit means at a predetermined time position within said output video signal basic sequence-repeated blanked interval, said predetermined time position being substantially centered within said output video signal basic sequence-repeated blanked interval.

3. The invention defined by claim 1, wherein said deflection logic circuit means alternates said basic and coordinate scan line sequences in a manner that minimizes the effect of television camera sensor means localized reduced basic scan direction sensitivity to target contrast features due to electron beam scanning along said coordinate scan direction, each said coordinate scan line sequence being alternated by said deflection logic circuit means with two successive basic scan line sequences.

4. The invention defined by claim 1, wherein the deflected electron beam scan lines in said basic sequence are each initiated by a timing signal having a predetermined repetition frequency, each of said deflected electron beam scan lines in said coordinate sequence also being initiated at said basic sequence scan line timing signal predetermined repetition frequency.

5. The invention defined by claim 4, wherein said deflection logic circuit means includes an interval circuit providing an active output whose duration defines said coordinate sequence time interval in response to a received interval start signal and a received interval stop signal, an interval start circuit that provides said interval start signal to said interval circuit at a repeatable fixed time after the termination of each said basic scan line sequence, and a counting circuit that provides said interval stop signal to said interval circuit at a repeatable fixed time after said interval start signal, said counting circuit counting a predetermined number of said basic sequence scan line timing signals to determine the time position of said interval stop signal and thereby define the duration of said interval circuit active output.

6. The invention defined by claim 1, wherein said sensor means includes a first sawtooth generator circuit controlling deflections of said electron beam along said basic scan direction and a second sawtooth generator circuit controlling deflections of said electron beam along said coordinate scan direction, said deflection logic circuit means permitting said second sawtooth generator circuit to control electron beam deflection along said coordinate scan direction at a first rate during said basic scan line sequence and causing said second sawtooth generator circuit to control electron beam deflection along said coordinate scan direction at a second rate substantially greater than said first rate during electron beam scanning along said coordinate scan direction.

7. The invention defined by claim 6, wherein said second sawtooth generator circuit second electron beam deflection rate is greater than approximately 260 times said second sawtooth generator circuit first electron beam deflection rate.

8. The invention defined by claim 1, wherein said sensor means includes a first sawtooth generator circuit controlling deflections of said electron beam along said basic scan direction and a second sawtooth generator circuit controlling deflections of said electron beam along said coordinate scan direction, said deflection logic circuit means permitting said first sawtooth generator circuit to control electron beam deflections along said basic scan direction at a first rate during said basic scan line sequence and causing said first sawtooth gtnerator circuit to control electron beam deflections along said basic scan direction at a second rate substantially less than said basic scan direction first rate during electron beam scanning along said coordinate scan direction.

9. The invention defined by claim 8, wherein said first sawtooth generator circuit second electron beam deflection rate is less than approximately 1/375 said first sawtooth generator circuit first electron beam deflection rate.

10. The invention defined by claim 8, wherein said first sawtooth generator second electron beam deflection rate is constant substantially throughout electron beam scanning along said coordinate scan direction.

11. In a method of developing and processing a tracking system television camera sensor means video signal to generate azimuthal and elevational electrical tracking error signals correlated to detected azimuthal and elevational displacements of target contrast features tracked transversely relative to the sensor means viewing axis, the steps comprising:

(a) scanning the image of a field of view and contained target by a television camera sensor means electron beam deflected transversely relative to a viewing axis and developing a correlated output video signal that varies in voltage amplitude as a result of scanned target contrast features, (b) converting said output video signal into output target contrast feature marker signals correlated in time to scanned target contrast feature voltage amplitude variations in said output video signal, (c) processing said output marker signals and generating azimuthal tracking error signals and elevational tracking error signals correlated to detected azimuthal and elevational displacements of tracker target contrast features relative to said viewing axis, and (d) deflecting said electron beam to form an output video signal having target contrast feature voltage amplitude variations derived from electron beam scanning of said field of view and contained target image repeatedly with a basic sequence of deflected electron beam scan lines oriented substantially parallel to a basic scan direction and having a blank interval in said output video signal after each basic sequence scan line and a different blank interval in said output video signal after each basic scan, and with a coordinate sequence of deflected electron beam scan lines oriented substantially at right angles to said basic scan direction, said coordinate sequence scan lines being positioned in a coordinate sequence time interval within said output video signal basic sequence-repeated blank interval, and said output video signal being unblanked during electron beam coordinate scanning in said coordinate sequence time interval.

12. The invention defined by claim 11, wherein said electron beam scanning basic sequence scan lines are each initiated at a predetermined repetition frequency, each of said coordinate sequence scan lines also being initiated at said basic sequence scan line predetermined repetition frequency.

13. The invention defined by claim 11, wherein said electron beam scanning coordinate sequence is positioned at a predetermined time interval within said output video signal basic sequence-repeated blanked interval, said predetermined time interval being substantially centered within said output video signal basic sequence-repeated blanked interval.

14. The invention defined by claim 11, wherein said electron beam scanning is accomplished in a manner that minimizes the effect of television camera sensor means localized reduced basic scan direction sensitivity to target contrast features due to electron beam scanning along said coordinate scan direction, said coordinate scan sequence being alternated with two successive basic scan sequences.

15. The invention defined by claim 11, wherein said eletcron beam is deflected along said coordinate scan direction at a first rate during said basic sequence of scan lines and is deflected along said coordinate scan direction at a second rate substantially greater than said first rate during electron beam scanning along said coordinate sequence of scan lines.

16. The invention defined by claim 15, wherein said electron beam deflection second deflection rate is greater than approximately 260 times said electron beam deflection first deflection rate.

17. The invention defined by claim 11, wherein said electron beam is deflected along said basic scan direction at a first rate during said basic sequence of scan lines and is deflected along said basic scan direction at a second rate substantially less than said basic scan direction first rate during electron beam scanning along said coordinate scan direction.

18. The invention defined by claim 17, wherein said electron beam basic scan direction second deflection rate is less than approximately 1/375 said basic scan direction first deflection rate.

19. The invention defined by claim 17, wherein said electron beam basic scan direction second deflection rate is substantially constant throughout electron beam scanning along said coordinate scan direction.

References Cited

UNITED STATES PATENTS

| | | | |
|---|---|---|---|
| 2,774,964 | 12/1956 | Baker | 178—6.8 |
| 2,877,354 | 3/1959 | Fairbank. | |
| 3,010,024 | 11/1961 | Barnett | 178—6.8 |
| 3,043,907 | 7/1962 | Martin | 178—6.8 |
| 3,199,400 | 8/1965 | Zabinski. | |
| 3,257,505 | 6/1966 | Van Wechel | 178—6.8 |
| 3,341,653 | 9/1969 | Kruse | 178—6.8 |

ROBERT L. GRIFFIN, Primary Examiner

J. A. ORSINO, JR., Assistant Examiner

U.S. Cl. X.R.

178—6; 250—203